May 23, 1967 J. W. MONROE ET AL 3,320,794
POSITIONING DEVICE FOR CENTER OF GRAVITY LOCATING APPARATUS
Filed Oct. 20, 1964

Joseph W. Monroe
Garland K. Grace
Richard O. Hessler,
INVENTORS.

3,320,794
POSITIONING DEVICE FOR CENTER OF
GRAVITY LOCATING APPARATUS
Joseph W. Monroe, Garland K. Grace, and Richard O. Hessler, Huntsville, Ala., assignors, by mesne assignments, to the United States of America as represented by the Secretary of the Army
Filed Oct. 20, 1964, Ser. No. 405,304
1 Claim. (Cl. 73—65)

This invention relates to a device for shifing an object on a balance platform of a center of gravity locating apparatus to the point of balance of the object regardless of its size or shape. Prior devices of this type consist of extremely complicated and expensive mechanisms many of which are capable of obtaining only an approximation of the exact center of gravity of the specimen. Our invention is particularly adapted to retain an object or specimen for the purpose of determining its center of gravity in a convenient and extremely accurate series of steps. Our device is designed specifically to enable an object or specimen of any shape to be moved, either longitudinally or laterally to the point at which it will balance perfectly on the balance platform of the center of gravity locating apparatus, and thus provides a means of assisting in locating the center of gravity of the object or specimen.

Accordingly, it is an object of this invention to provide a reliable and extremely accurate means of positioning or orienting a specimen or object for locating the center of gravity of that object regardless of its size or shape.

Another object of our invention is to provide a positioning device for use in measuring or locating the center of gravity of a non-symmetrical object which device is both economical and simple in operation.

Yet another objetc of the invention is to provide a positioning device which may be easily modified to accommodate extremely large objects, such as rocket motors, for the purpose of determining their centers of gravity.

This invention, together with other objects and advantages, will best be understood by reference to the following description and accompanying drawings in which.

Figure 1:
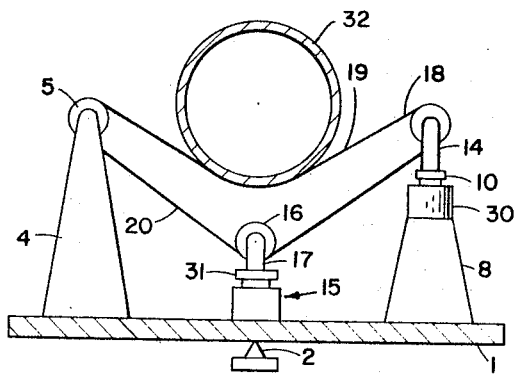
FIGURE 1 is an elevational view showing the primary components of the positioning device with the specimen in place thereon.
Figure 2:
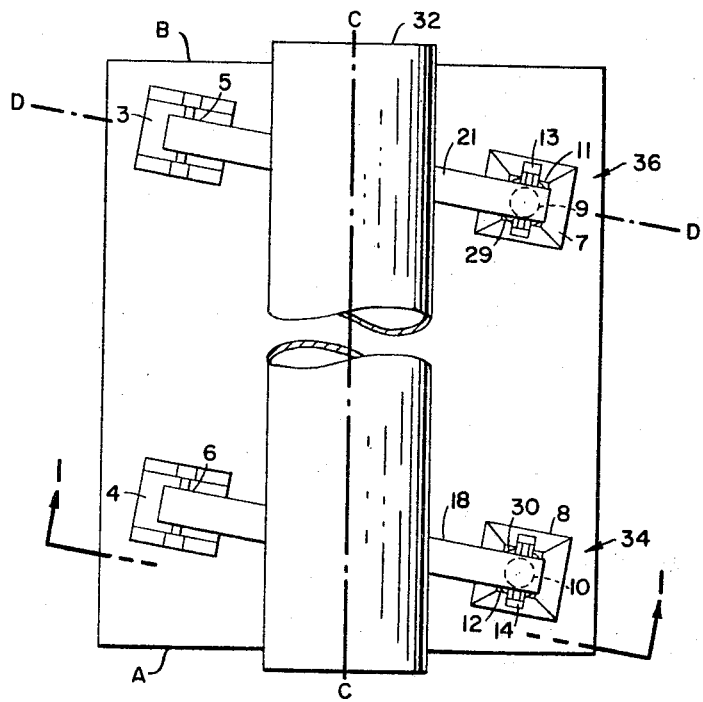
FIGURE 2 is a plan view of the positioning device illustrating the general attitude of the specimen holding belts as related to the remainder of the device.

Referring now in particular to FIGURE 1, a rectangular balance platform 1 of a center of gravity locating apparatus is mounted upon a pivot mount 2 which is located at the exact center of gravity of the balance platform. Pivot mount 2, commonly referred to in the art as a "resolving center," represents a real or simulated single point suspension system. While not forming a part of the present invention, it is noted, for example, that the balance platform preferably has as its supporting structure a floating frame (not shown) suspended on a plurality of legs (not shown) whose axes focus on the resolving center, the legs being attached between the floating frame and a base pedestal (not shōwn) by flexure pivots (not shown). Mounted on the blance platform adjacent one side edge thereof is a pair of rotatably driven elevated roller mounts 3 and 4 which, respectively, support a pair of rollers 5 and 6. These rollers are rotated by means of a motor or other driving means within the elevated mount. The driving means are not illustrated and may be of conventional design. On the balance platform adjacent the opposite side thereof, i.e. on the opposite side of the longitudinal center axis C—C of the platform, is located a pair of piston mounts which are attached to the platform slightly forward of the elevated mounts. Hence, each of the respective piston mounts is disposed, relative to each of the respective roller mounts, on opposite sides of longitudinal platform axis C—C (FIGURE 2) in diagonally opposite relationship therewith, and the pair of piston mounts 7 and 8 on one side of said axis are disposed forwardly of the pair of respective roller mounts 3 and 4 on the opposite side of said axis. Accordingly, piston mount 7 is diagonally opposite roller mount 3 with respect to the longitudinal platform axis. The angular disposition of the diagonally opposite mounts is illustrated in FIGURE 2 wherein the centerline D—D joining their centers, and passing through the center mount 15, intersects longitudinal axis C—C at oblique angles. Additionally, the centerline (not shown) through diagonally opposite mounts 4 and 8 is parallel to centerline D—D. A pair of cylinders 29 and 30 are attached to the upper portion of these mounts for reception of pistons 9 and 10, respectively. A pair of rollers 11 and 12 are attached to the pistons by means of adapters 13 and 14. These pistons may be moved in a vertical direction by supplying pressure for example, fluid pressure from any conventional means to the interior of cylinders 29 and 30. Intermediate the piston mounts and the elevated roller mounts, and in alignment therewith, is located a pair of center mounts or tensioning devices 15 each of which consists of a piston cylinder arrangement. These center mounts are each mounted on the longitudinal center axis C—C in spaced-apart relationship. The pistons are adapted to move in a vertical direction for adjustment of a roller 16 which is mounted to a piston 31 by an adapter 17. A pair of endless belts 18 and 21 form a cradle between the elevated roller and piston mounts for reception of the specimen which is to be balanced. Belt 18 forms an upper cradle portion 19 as well as a lower tensioning section 20. The lower tensioning section passes beneath roller 16 which provides a means for adjusting the height of the specimen by varying the tension of the belt. Hence, it can be seen that a pair of fore and aft cradel assemblies 34 and 36 are provided on the platform adjacent fore and aft tends A and B thereof for supporting a specimen 32 thereon. The fore cradle assembly 34 includes roller mount 4, piston mount 8, a center mount 15 and belt 18. Likewise, the aft cradle assembly 36 includes roller mount 3, piston mount 7, a center mount 15 and belt 21. As depicted in FIGURE 2, the centerlines D—D passing through the rollers and belts of the respective cradle assemblies are parallel to each other and intersect the centerline C—C in an obliquely angled manner.

In operation of the device, the specimen is placed on the upper portion 19 of the belt. The specimen may be moved in any direction desired which will accomplish balancing of the entire platform and specimen combination. If the specimen is of an irregular shape which would be difficult to maneuver on the belts it need only be mounted rigidly in a cylindrical sleeve. Movement of the specimen, which, for the purpose of illustration, is a rocket motor absent the exhaust nozzle thereof, in a longitudinal direction is accomplished by actuation of the motorized driving rollers 5 and 6 which will rotate belts 18 and 21 which in turn roll the specimen within the cradle. Due to the angle between the oblique arrangement of the elevated roller mounts relative to the piston mounts, the specimen will be moved in a forward or rearward as desired. If lateral movement of the desired, pistons 9 and 10 will be moved in a vertical direction thus causing movement of the specimen toward the right or left of the balance platform. Tensioning devices 15 may be adjusted vertically to determine the relative depth of the cradle formed by the belts 18 and 21. Thus, it will be seen that by simple actuation of either the motorized rollers or the vertically adjustable pistons the specimen may be accurately moved, both laterally and longitudinally on the balance platform until it reaches the point of exact balance of the combined device, i.e., the test specimen is oriented along its longitudinal and transverse axes until balanced over the pivot point or resolving center which has been established in calibrating the apparatus. This condition of balance may be determined by any convenient means, not forming part of this invention, e.g., by a pair of spirit levels (not shown) secured one on a transverse edge and one on a longitudinal edge of the balance platform. External measurements may then be made from the pivot point or resolving center to any reference point, e.g., a scribe line or end adapter hole, on the motor specimen. Such measurements may be made, for example, by conventional, externally mounted optical instruments, tooling bars, transits and the like (not shown). As will be obvious, it is required that three center-of-gravity components be measured. Two of these components can be read directly, i.e., the longitudinal center of gravity and one component (X coordinate) of the transverse or radial center of gravity. It is then necessary to rotate the test specimen through 90° to obtain the second transverse or radial component (Y coordinate). These two lateral components (X, Y) may then be used to determine the overall lateral center of gravity (C), e.g., by solving algebraically using $C=\sqrt{X^2 \times Y^2}$.

The foregoing is a description of the preferred embodiment. The following claim is intended to include those modifications and variations that are within the spirit and scope of the invention.

We claim:

A positioning device for a center of gravity locating apparatus comprising: a rectangular balance platform disposed horizontally and having a longitudinal center axis and fore and aft ends; a pair of elevated roller mounts mounted on said platform adjacent one side edge thereof and spaced apart longitudinally thereof, each roller mount having a rotatably driven roller mounted on the upper portion thereof; a pair of elevated piston mounts mounted on the balance platform adjacent the opposite side edge and spaced apart longitudinally thereof, each said piston mount having a vertically movable piston mounted therein, each said piston having a rotatable roller mounted on the upper portion thereof; each of the respective piston mounts being disposed relative to the respective roller mounts on opposite sides of said longitudinal platform axis in diagonally opposite relationship therewith, wherein the pair of mounts on one side of said longitudinal axis are disposed forwardly of the pair of mounts on the opposite side thereof; a pair of center mounts mounted on the longitudinal axis of said platform, one intermediate each of said diagonally opposed roller and piston mounts, each of said center mounts having a vertically adjustable roller carried by the upper end thereof; and, a pair of continuous belts, one belt extending between the respective rollers of each pair of oppositely mounted roller and piston mounts and forming a cradle therebetween, the lower portion of each belt extending beneath one of said intermediate rollers.

References Cited by the Examiner
UNITED STATES PATENTS

| | | | |
|---|---|---|---|
| 2,336,142 | 12/1943 | Watson | 73—65 |
| 2,782,631 | 2/1957 | Baltrukonis et al. | 73—65 |
| 3,210,989 | 10/1965 | Samborsky et al. | 73—65 |

RICHARD C. QUEISSER, *Primary Examiner.*

C. I. McCLELLAND, *Assistant Examiner.*